United States Patent
Dudde et al.

(10) Patent No.: US 9,994,425 B1
(45) Date of Patent: Jun. 12, 2018

(54) COMPACT MOTOR ARRANGEMENT WITH INTEGRATED BRAKES AND SHAFT BEARINGS

(71) Applicants: THYSSENKRUPP ELEVATOR AG, Essen (DE); THYSSENKRUPP AG, Essen (DE)

(72) Inventors: Frank Dudde, Collierville, TN (US); Peter Feldhusen, Collierville, TN (US)

(73) Assignees: ThyssenKrupp Elevator AG, Essen (DE); ThyssenKrupp AG, Essen (DE)

( * ) Notice: Subject to any disclaimer, the term of this patent is extended or adjusted under 35 U.S.C. 154(b) by 0 days. days.

(21) Appl. No.: 15/376,035

(22) Filed: Dec. 12, 2016

(51) Int. Cl.
| | |
|---|---|
| *B66B 11/04* | (2006.01) |
| *H02K 9/02* | (2006.01) |
| *F16D 65/847* | (2006.01) |
| *B66B 1/36* | (2006.01) |
| *H02K 5/20* | (2006.01) |
| *F16C 37/00* | (2006.01) |
| *B66B 9/00* | (2006.01) |
| *H02K 7/102* | (2006.01) |

(Continued)

(52) U.S. Cl.
CPC .............. *B66B 11/043* (2013.01); *B66B 1/36* (2013.01); *B66B 9/00* (2013.01); *F16C 37/007* (2013.01); *F16D 65/847* (2013.01); *H02K 5/20* (2013.01); *H02K 7/083* (2013.01); *H02K 7/102* (2013.01); *H02K 9/02* (2013.01); *F16D 55/22* (2013.01)

(58) Field of Classification Search
CPC ... B66B 11/043; B66B 11/0438; F16D 59/02; F16D 65/84; F16D 65/847; H02K 7/1021; H02K 7/1023; H02K 7/1025; H02K 9/00; H02K 9/005; H02K 9/02; H02K 9/04; H02K 9/06
See application file for complete search history.

(56) References Cited

U.S. PATENT DOCUMENTS

| | | | |
|---|---|---|---|
| 1,896,776 A | * | 2/1933 | James .................. B66B 5/286 187/249 |
| 3,338,349 A | | 8/1967 | Klinkenberg et al. |

(Continued)

FOREIGN PATENT DOCUMENTS

| | | |
|---|---|---|
| BR | PI04046234 A | 6/2006 |
| DE | 1032496 | 6/1958 |

(Continued)

*Primary Examiner* — Minh Truong
(74) *Attorney, Agent, or Firm* — The Webb Law Firm

(57) ABSTRACT

A motor for use with an elevator system may include a housing, a motor shaft surrounded by the housing and having at least a first end extending outward from the housing, a motor body arranged around a central portion of the motor shaft and positioned within the housing, at least one sheave positioned at the first end of the motor shaft and rotatable with the motor shaft, and a braking system positioned at a first end of the housing. The braking system may include a brake rotor connected to and rotatable with the motor shaft and closing an axial opening at the first end of the housing, a brake shoe positioned at the first end of the housing, and a brake actuator configured to selectively move the brake shoe between a brake position in which the brake shoe is in contact with the brake rotor to resist rotation of the motor shaft and a rotation position in which the brake shoe is free from contact with the brake rotor.

16 Claims, 5 Drawing Sheets

(51) Int. Cl.
 *H02K 7/08* (2006.01)
 *F16D 55/22* (2006.01)

(56) References Cited

U.S. PATENT DOCUMENTS

| | | | | |
|---|---|---|---|---|
| 3,945,476 | A * | 3/1976 | de Jong | F16D 65/847 192/113.23 |
| 4,049,089 | A * | 9/1977 | Rundle | F16D 55/28 188/171 |
| 4,071,121 | A * | 1/1978 | Daniel | F16D 55/02 188/171 |
| 4,228,385 | A * | 10/1980 | Angersbach | B23Q 15/26 318/603 |
| 4,562,367 | A * | 12/1985 | Kumatani | H02K 7/1025 310/266 |
| 4,589,534 | A * | 5/1986 | Apetrei | F16D 67/06 192/113.23 |
| 4,643,282 | A * | 2/1987 | Edl | H02K 7/1125 192/111.1 |
| 4,684,838 | A | 8/1987 | Casanova | |
| 5,631,510 | A | 5/1997 | Flaig et al. | |
| 5,982,063 | A | 11/1999 | Lutz et al. | |
| 6,398,685 | B1 * | 6/2002 | Wachauer | B60K 1/00 180/65.6 |
| 6,488,124 | B1 * | 12/2002 | Yasuda | B66B 11/0045 187/251 |
| 6,598,707 | B2 | 7/2003 | Nakagaki et al. | |
| 7,367,431 | B2 | 5/2008 | Ach | |
| 7,540,365 | B2 * | 6/2009 | Juergensmeyer | F16D 27/112 192/84.2 |
| 8,113,318 | B2 | 2/2012 | Monzon et al. | |
| 8,157,058 | B2 * | 4/2012 | Ach | B66B 7/062 187/251 |
| 8,220,599 | B2 | 7/2012 | Fischer | |
| 8,602,170 | B2 | 12/2013 | Fischer | |
| 9,359,069 | B2 * | 6/2016 | Drennen | B64C 25/44 |
| 2006/0151254 | A1 | 7/2006 | Sevilleja-Perez et al. | |
| 2010/0126808 | A1 | 5/2010 | Hashiguchi | |
| 2016/0056690 | A1 * | 2/2016 | Hirai | H02K 5/161 310/60 A |

FOREIGN PATENT DOCUMENTS

| | | |
|---|---|---|
| DE | 102013101855 A1 | 8/2014 |
| EP | 1834919 B1 | 6/2011 |
| JP | 687595 A | 3/1994 |
| JP | 3152034 B2 | 4/2001 |
| JP | 2003104657 A | 4/2003 |
| JP | 4145977 B2 | 9/2008 |
| JP | 4195044 B2 | 12/2008 |
| JP | 4255523 B2 | 4/2009 |
| JP | 4262796 B2 | 5/2009 |
| WO | 03078290 A1 | 9/2003 |

* cited by examiner

COMPACT MOTOR ARRANGEMENT WITH INTEGRATED BRAKES AND SHAFT BEARINGS

BACKGROUND OF THE INVENTION

Field of the Invention

This disclosure relates generally to a motor for use with an elevator system and, more particularly, to a motor having a compact structure with integrated brakes for use with an elevator system.

Description of Related Art

Typical elevator systems include a load bearing member, such as a rope or a belt, for supporting and moving an elevator car up and down within an elevator shaft. The load bearing member in most instances couples a counterweight to the elevator car. A motor unit is coupled to the load bearing member via a traction sheave to move the load bearing member and thereby move the elevator car through the elevator shaft. Many motor units of elevator systems are installed on the top of guide rails that guide the counterweight and elevator car. The motor unit in such an arrangement may include a motor shaft that has a first end extending from a first side of the motor housing and a second end extending from a second side of the motor housing. Traction sheaves are provided on the first end and the second end of the motor shaft. In such instances, the load bearing members are divided in two bundles on either side of the guide rail of the elevator car and are connected to traction sheaves of the first and second ends of the motor shaft.

Conventional motor units of this type include a motor shaft, at least one motor body, at least one mechanical brake, at least two bearings, and at least one traction sheave on each end of the motor shaft. The motor bodies, mechanical brakes, bearings, and traction sheaves are arranged adjacent to each other along the longitudinal direction of the motor shaft and are connected to the motor shaft. Accordingly, the motor shaft must have a length that is at least equal to the length of the combination of the various motor elements, mechanical brakes, bearings, and traction sheaves. As a result, the length of the motor shaft and, therefore, the overall length of the motor must be significantly longer than the length of the various motor elements because the motor shaft must be long enough to accommodate the brake, the bearings, and the traction sheaves. This situation is further aggravated by the fact that in many elevator system arrangements, with the motor unit installed on top of the guide rails as described above, the ropes or belts are divided in two bundles in order to pass the car guide rail. In these arrangements, the width of the car guide rails needs to be added to the motor shaft length.

The increasing length of the motor shafts demands a more complex bearing system and a bigger shaft diameter. Accordingly, the motor units are heavy and bulky as well as less economic. In addition, installing such motor units within the elevator shafts is difficult due to the large size of these units.

SUMMARY OF THE INVENTION

In view of the foregoing, a need exists for a more compact motor structure that includes a braking system and bearings incorporated therein. A further need exists for a ventilation system for such a compact motor that allows for a fast heat dissipation and prevents high peak temperatures.

In accordance with one aspect of the present disclosure, a motor for use with an elevator system may include a housing, a motor shaft surrounded by the housing and having at least a first end extending outward from the housing, a motor body arranged around a central portion of the motor shaft and positioned within the housing, at least one sheave positioned at the first end of the motor shaft and rotatable with the motor shaft, and a braking system positioned at a first end of the housing. The braking system may include a brake rotor connected to and rotatable with the motor shaft and closing an axial opening at the first end of the housing, a brake shoe positioned at the first end of the housing, and a brake actuator configured to selectively move the brake shoe between a brake position in which the brake shoe is in contact with the brake rotor to resist rotation of the motor shaft and a rotation position in which the brake shoe is free from contact with the brake rotor.

The motor may further comprise a bearing positioned at the first end of the housing in contact with the motor shaft and parallel to the brake actuator in a longitudinal direction of the motor shaft. The bearing and the brake actuator may be at least partially aligned in a radial direction of the motor shaft. A length of the brake actuator in the longitudinal direction of the motor shaft may be less than or equal to a length of the bearing in the longitudinal direction of the motor shaft. The motor may also further comprise a ventilation system configured to allow heat to dissipate from the housing. Such a ventilation system may include a plurality of openings formed around a circumference of the brake rotor, a plurality of openings formed around a circumference of the brake shoe, and a plurality of openings formed in the first end of the housing and extending outwardly through the housing. The plurality of openings formed around the circumference of the brake shoe may be arranged to align with the plurality of openings formed in the first end of the housing. The motor shaft may further comprise a second end extending outside of the housing opposite to the first end of the motor shaft. At least one sheave may be positioned at the second end of the motor shaft and is rotatable with the motor shaft. A second braking system may be positioned at a second end of the housing. The second braking system may include a second brake rotor connected to and rotatable with the motor shaft and closing an axial opening at the second end of the housing, a second brake shoe positioned at the second end of the housing, and a second brake actuator configured to selectively move the second brake shoe between a brake position in which the second brake shoe is in contact with the second brake rotor to resist rotation of the motor shaft and a rotation position in which the second brake shoe is free from contact with the second brake rotor.

In accordance with another aspect of the present disclosure, an elevator system may include a car configured to moving up and down within an elevator shaft and a motor disposed in the elevator shaft to move the car up and down within the elevator shaft. The motor may include a housing, a motor shaft surrounded by the housing and having at least a first end extending outward from the housing, a motor body arranged around a central portion of the motor shaft and positioned within the housing, at least one sheave positioned at the first end of the motor shaft and rotatable with the motor shaft, and a braking system positioned at a first end of the housing. The braking system may include a brake rotor connected to and rotatable with the motor shaft and closing an axial opening at the first end of the housing, a brake shoe positioned at the first end of the housing, and a brake actuator configured to selectively move the brake shoe between a brake position in which the brake shoe is in contact with the brake rotor to resist rotation of the motor shaft and a rotation position in which the brake shoe is free from contact with the brake rotor.

Further aspects will now be described in the following numbered clauses.

Clause 1: A motor comprising: a housing; a motor shaft surrounded by the housing and having at least a first end extending outward from the housing; a motor body arranged around a central portion of the motor shaft and positioned within the housing; at least one sheave positioned at the first end of the motor shaft and rotatable with the motor shaft; and a braking system positioned at a first end of the housing, wherein the braking system comprises: a brake rotor connected to and rotatable with the motor shaft and closing an axial opening at the first end of the housing; a brake shoe positioned at the first end of the housing; and a brake actuator configured to selectively move the brake shoe between a brake position in which the brake shoe is in contact with the brake rotor to resist rotation of the motor shaft and a rotation position in which the brake shoe is free from contact with the brake rotor.

Clause 2: The motor of Clause 1, further comprising a bearing positioned at the first end of the housing in contact with the motor shaft and parallel to the brake actuator in a longitudinal direction of the motor shaft, and/or wherein the bearing and the brake actuator are at least partially aligned in a radial direction of the motor shaft.

Clause 3: The motor of Clause 2, wherein a length of the brake actuator in the longitudinal direction of the motor shaft is less than or equal to a length of the bearing in the longitudinal direction of the motor shaft.

Clause 4: The motor of any of Clauses 1-3, further comprising a ventilation system configured to allow heat to dissipate from the housing.

Clause 5: The motor of Clause 4, wherein the ventilation system comprises: a plurality of openings formed around a circumference of the brake rotor; a plurality of openings formed around a circumference of the brake shoe; and a plurality of openings formed in the first end of the housing and extending outwardly through the housing.

Clause 6: The motor of Clause 5, wherein the plurality of openings formed around the circumference of the brake shoe is arranged to align with the plurality of openings formed in the first end of the housing.

Clause 7: The motor of any of Clauses 1-6, wherein the motor shaft further comprises a second end extending outside of the housing opposite to the first end of the motor shaft.

Clause 8: The motor of Clause 7, wherein at least one sheave is positioned at the second end of the motor shaft and is rotatable with the motor shaft.

Clause 9: The motor of Clause 7, wherein a second braking system is positioned at a second end of the housing.

Clause 10: The motor of Clause 9, wherein the second braking system comprises: a second brake rotor connected to and rotatable with the motor shaft and closing an axial opening at the second end of the housing; a second brake shoe positioned at the second end of the housing; and a second brake actuator configured to selectively move the second brake shoe between a brake position in which the second brake shoe is in contact with the second brake rotor to resist rotation of the motor shaft and a rotation position in which the second brake shoe is free from contact with the second brake rotor.

Clause 11: An elevator system comprising: a car configured to move up and down within an elevator shaft; and a motor disposed in the elevator shaft to move the car up and down within the elevator shaft, the motor comprising: a housing; a motor shaft surrounded by the housing and having at least a first end extending outward from the housing; a motor body arranged around a central portion of the motor shaft and positioned within the housing; at least one sheave positioned at the first end of the motor shaft and rotatable with the motor shaft; and a braking system positioned at a first end of the housing, the braking system comprising: a brake rotor connected to and rotatable with the motor shaft and closing an axial opening at the first end of the housing; a brake shoe positioned at the first end of the housing; and a brake actuator configured to selectively move the brake shoe between a brake position in which the brake shoe is in contact with the brake rotor to resist rotation of the motor shaft and a rotation position in which the brake shoe is free from contact with the brake rotor.

Clause 12: The elevator system of Clause 11, wherein the motor further comprises a bearing positioned at the first end of the housing in contact with the motor shaft and parallel to the brake actuator in a longitudinal direction of the motor shaft, and/or wherein the bearing and the brake actuator are at least partially aligned in a radial direction of the motor shaft.

Clause 13: The elevator system of Clause 12, wherein a length of the brake actuator in the longitudinal direction of the motor shaft is less than or equal to a length of the bearing in the longitudinal direction of the motor shaft.

Clause 14: The elevator system of any of Clauses 11-13, wherein the motor further comprises a ventilation system configured to allow heat to dissipate from the housing.

Clause 15: The elevator system of Clause 14, wherein the ventilation system comprises: a plurality of openings formed around a circumference of the brake rotor; a plurality of openings formed around a circumference of the brake shoe; and a plurality of openings formed in the first end of the housing and extending outwardly through the housing.

Clause 16: The elevator system of Clause 15, wherein the plurality of openings formed around the circumference of the brake shoe is arranged to align with the plurality of openings formed in the first end of the housing.

Clause 17: The elevator system of any of Clauses 11-16, wherein the motor shaft further comprises a second end extending outside of the housing opposite to the first end of the motor shaft.

Clause 18: The elevator system of Clause 17, wherein at least one sheave is positioned at the second end of the motor shaft and is rotatable with the motor shaft.

Clause 19: The elevator system of Clause 17, wherein a second braking system is positioned at a second end of the housing.

Clause 20: The elevator system of Clause 19, wherein the second braking system comprises: a second brake rotor connected to and rotatable with the motor shaft and closing an axial opening at the second end of the housing; a second brake shoe positioned at the second end of the housing; and a second brake actuator configured to selectively move the second brake shoe between a brake position in which the second brake shoe is in contact with the second brake rotor to resist rotation of the motor shaft and a rotation position in which the second brake shoe is free from contact with the second brake rotor.

These and other features and characteristics of the systems and/or devices of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the systems and/or devices of the present disclosure. As used in the specification and the claims, the singular form of "a", "an", and "the" include plural referents unless the context clearly dictates otherwise.

DESCRIPTION OF THE INVENTION

Figure 1:
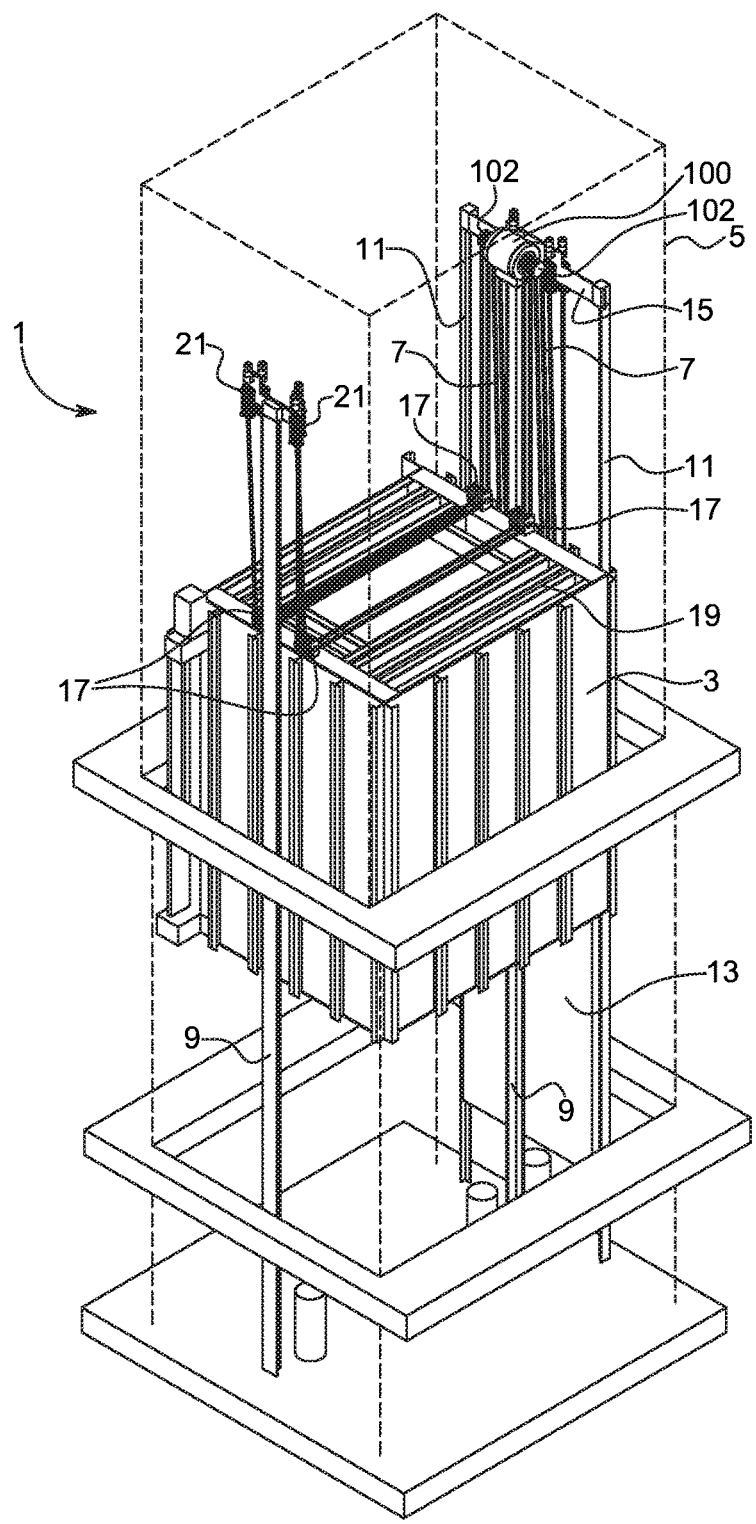
FIG. 1 is a perspective view of an elevator system including a motor according to an aspect of the present disclosure.

For purposes of the description herein, the terms "upper", "lower", "right", "left", "vertical", "horizontal", "top", "bottom", "lateral", "longitudinal", and derivatives thereof shall relate to the disclosure as it is oriented in the drawing figures. It is to be understood, however, that the disclosure may assume alternative variations and step sequences, except where expressly specified to the contrary. It is also to be understood that the specific devices and processes illustrated in the attached drawings, and described in the following specification, are simply exemplary embodiments of the disclosure. Hence, specific dimensions and other physical characteristics related to the embodiments disclosed herein are not to be considered as limiting.

One aspect of the present disclosure is a compact motor structure for use with an elevator system that includes a braking system and bearings incorporated therein. The motor structure further includes a ventilation system for such a compact motor that allows for efficient and effective heat dissipation and prevents high peak temperatures to allow for such a compact motor structure.

With reference to FIG. 1, an elevator system 1 includes an elevator car 3 movable within an elevator shaft 5 using a plurality of load bearing members 7 that raise and/or lower the elevator car 3 within the elevator shaft 5. The elevator system 1 further includes a pair of car guide rails 9 and a pair of counterweight guide rails 11 for guiding the elevator car 3 and a counterweight 13, respectively, as the elevator car 3 and the counterweight 13 are raised and lowered within the elevator shaft 5.

A connecting beam 15 extends across the tops of the counterweight guide rails 11 for mounting a motor 100 thereto. The motor 100 is provided to lift and lower the elevator car 3 up and down within the elevator shaft 5. The motor 100, which will be described in greater detail hereinafter, includes traction sheaves 102 attached at both ends of a motor shaft extending through the motor 100. The motor 100 is positioned on the connecting beam 15 such that one of the car guide rails 9 is positioned between the traction sheaves 102. While the motor 100 is illustrated as including a traction sheave 102 at both ends thereof, in certain implementations, a traction sheave 102 may be provided at only one end of the motor 100.

The load bearing members 7 are wound around the traction sheaves 102, passed through pulleys (not shown) provided on an upper surface of the counterweight 13, and are secured to an end termination 21 provided at an upper end of a the counterweight guide rails 11 and an upper end of the car guide rail 9 adjacent to the motor 100. The other end of each load bearing member 7 extends from the traction sheaves 102, passes through pulleys 17 provided on an upper surface 19 of the elevator car 3, and is secured to a separate end termination 21 provided at an upper end of the car guide rail 9 opposite of the car guide rail 9 provided adjacent to the motor 100. Using this arrangement, the motor 100 is configured to drive the load bearing members 7 to lift and lower the elevator car 3.

Figure 2:
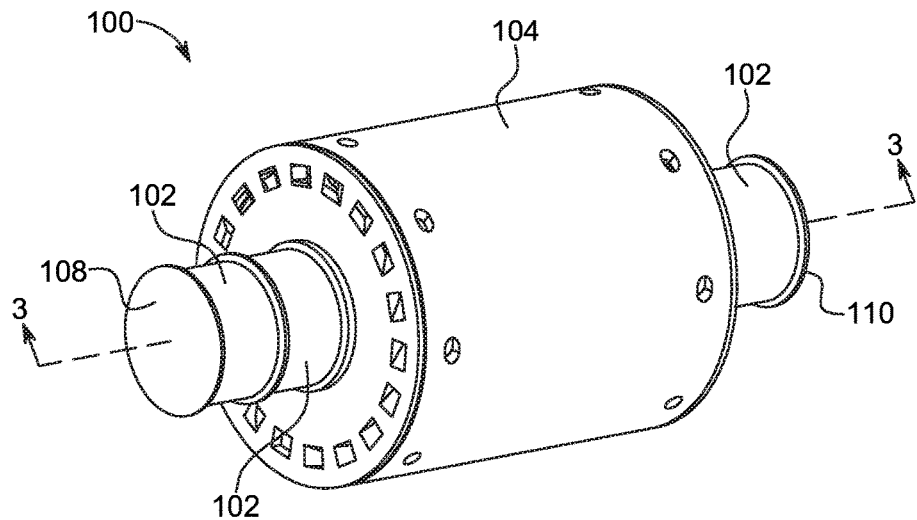
FIG. 2 is a perspective view of a motor according to an aspect of the present disclosure.
Figure 3:
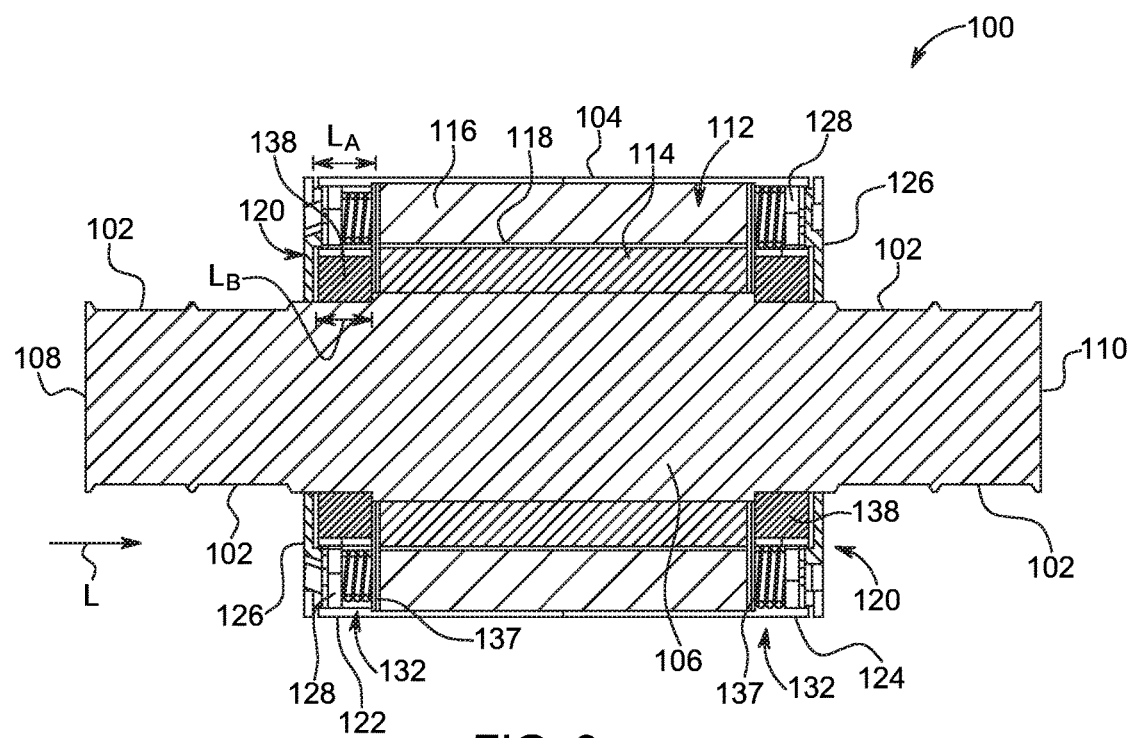
FIG. 3 is a cross-sectional view of the motor taken along line 3-3 of FIG. 2.

With reference to FIGS. 2 and 3 and with continued reference to FIG. 1, the motor 100 is provided with a compact longitudinal arrangement making it more economical to manufacture and easier to install. More particularly, the motor 100 includes a housing 104 and a motor shaft 106 surrounded by the housing and having a first end 108 and a second end 110 extending outside of the housing 104. A motor body 112 is arranged around a central portion of the motor shaft 106 and is positioned within the housing 104. The motor body 112 may be any conventional motor body and typically includes a rotor 114 secured to the motor shaft 106 and configured to rotate with the motor shaft 106 and a stator 116 secured to the housing 104 and positioned away from the rotor 114 by an air gap 118.

As discussed herein, the traction sheaves 102 are positioned on or formed within the first end 108 and the second end 110 of the motor shaft 106. The traction sheaves 102 are configured to receive the load bearing members 7 of the elevator system 1 as described herein. While FIGS. 2 and 3 illustrate the motor shaft 106 having a pair of traction sheaves 102 at each end, this is not to be construed as limiting the present disclosure as any suitable number of traction sheaves 102 may be provided at the ends of the motor shaft 106, or only at one end.

Figure 4:
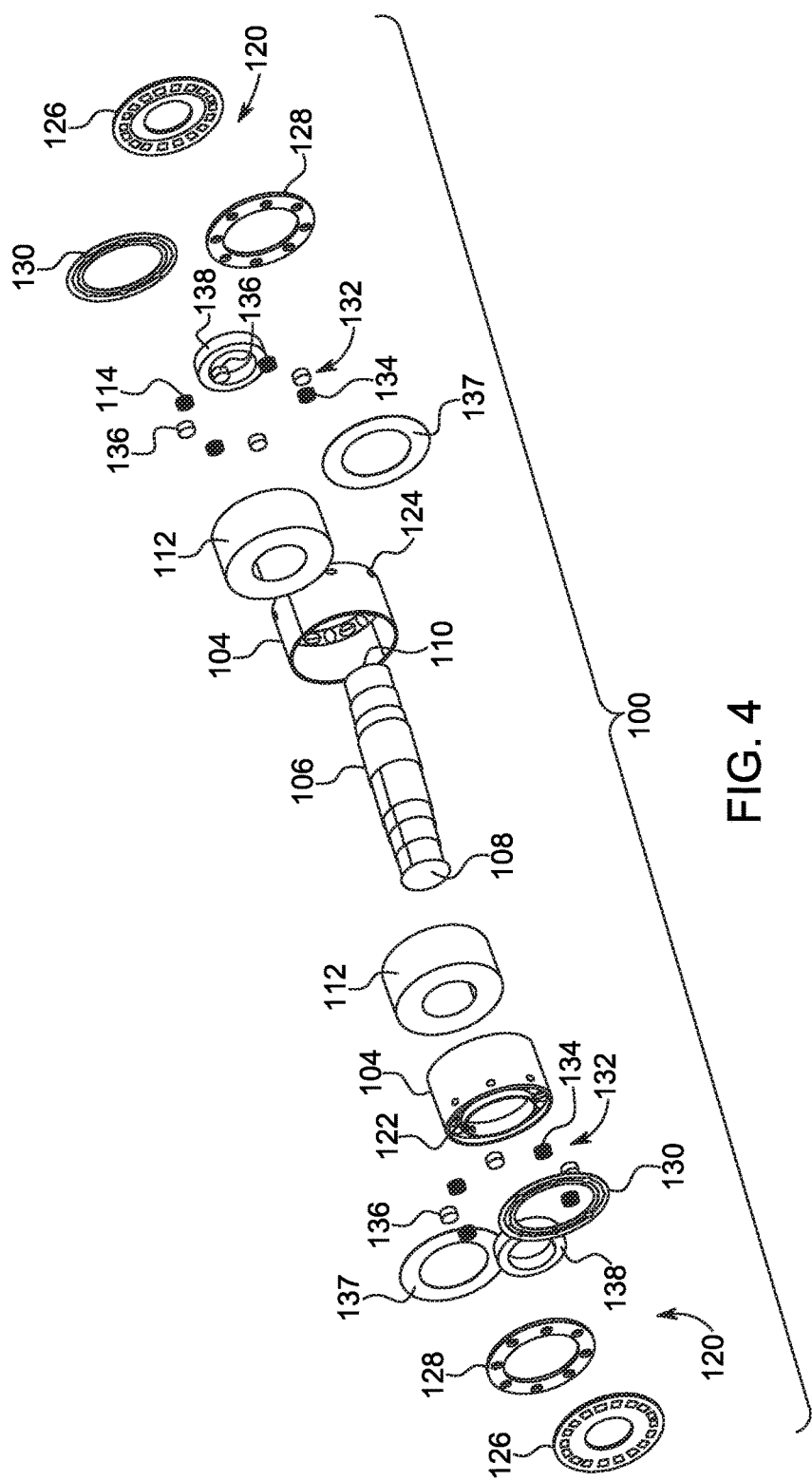
FIG. 4 is an exploded perspective view of the motor of FIG. 2.
Figure 5:
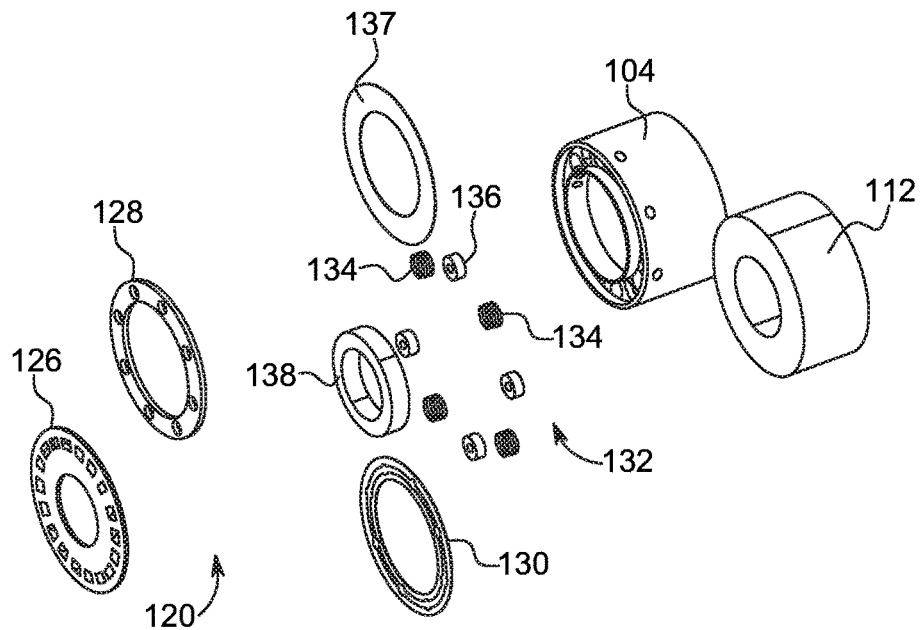
FIG. 5 is an exploded perspective view of a portion of the motor of FIG. 4.

With further reference to FIGS. 4 and 5, the motor 100 further comprises a pair of identical braking systems 120 positioned at a first end 122 and a second end 124 of the housing 104, respectively. Each braking system 120 includes a brake rotor 126 connected to and rotatable with the motor shaft 106. Each of the brake rotors 126 closes an axial opening at the end of the housing 104. Since one side of the brake rotor 126 closing an axial opening at the end of the housing 104 and is not covered, more thermal energy can leave the braking systems 120 as convection and radiant heat. This results in a higher thermal capacity of the braking systems 120 compared to enclosed disc brakes and therefore allows for a more compact motor arrangement.

A brake shoe 128 is positioned at each end of the housing 104. The brake shoe 128 includes a brake pad 130 formed thereon. When the braking system 120 is actuated, the brake shoe 128 is moved to bring the brake pad 130 into contact with the brake rotor 126. The braking system 120 also includes a brake actuator 132 comprised of a plurality of biasing members 134 and electromagnets 136. The biasing members 134 may be coil springs or any other suitable biasing device. The electromagnetics 136 are configured to hold the brake shoe 128 at a spaced distance from the brake rotor 126 against the bias force of the biasing members 134. Once a controller (not shown) deactivates the electromagnets 136 the bias force of the biasing members 134 move the brake shoe 128 to a brake position in which the brake pad 130 is in contact with the brake rotor 126 to resist rotation of the motor shaft 106. Once the controller activates the electromagnets 136, the brake shoe 128 is drawn back to a rotation position in which the brake pad 130 provided on the brake shoe 128 is free from contact with the brake rotor 126.

The motor 100 also includes a bearing 138 positioned at each end 122, 124 of the housing 104. Each bearing 138 is positioned in contact with the motor shaft 106 and parallel to the brake actuator 132 in a longitudinal direction L of the motor shaft 106 such that the bearings 138 and the brake actuator 132 are coaxial. In addition, the bearings 138 and the brake actuator 132 are at least partially aligned in a radial direction of the motor shaft 106. By positioning the bearings 138 and the brake actuators 132 in this coaxial manner, the overall horizontal length of the motor 100 can be decreased leading to a more compact motor design. As shown in FIG. 3, a length LA of the brake actuator 132 in the longitudinal direction L of the motor shaft 106 is less than or equal to a length LB of the bearing 138 in the longitudinal direction L of the motor shaft 106.

Figure 6:
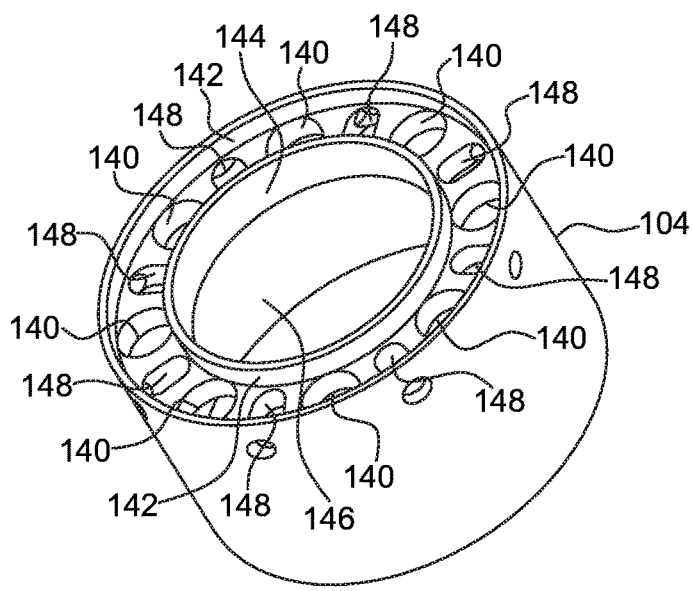
FIG. 6 is a perspective view of a portion of a motor housing of the motor of FIG. 2.

With additional reference to FIG. 6, each end of the housing 104 includes a series of pockets 140 positioned around a circumference thereof for alternately positioning the biasing members 134 and the electromagnets 136 of the brake actuator 132. Each end 122, 124 of the housing 104 also includes brake shoe guiding surfaces 142 to guide the brake shoe 128 during movement from the rotation position to the brake position and to support the brake torque. The housing 104 also provides seating surfaces 144 at each end thereof 122, 124 for the bearings 138 and a seating surface 146 for the motor body. In addition, a plurality of ventilation openings 148 are formed around the circumference of each of the ends 122, 124 of the housing 104 between each of the pockets 140. These ventilation openings 148 are configured to extend to from the ends of the housing outwardly through the housing 104 at an angle.

Figure 7:
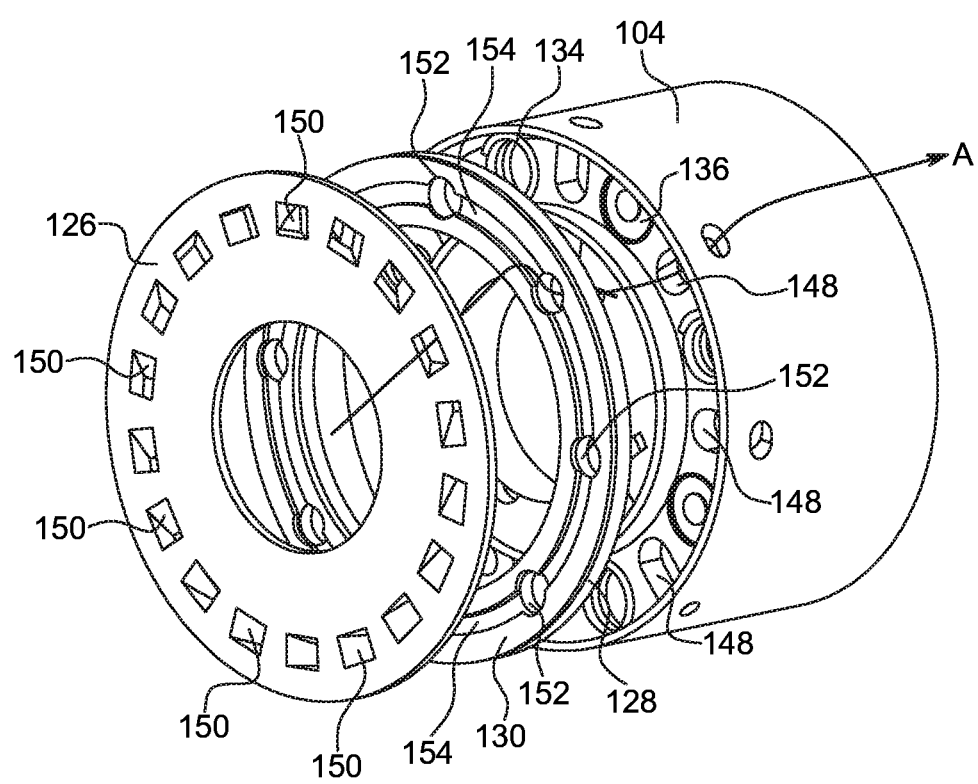
FIG. 7 is an exploded perspective view of a portion of the motor of FIG. 2 with the motor shaft removed.

With reference to FIG. 7, the motor 100 may also further comprise a ventilation system configured to allow heat to dissipate from the housing 104. Such a ventilation system may include a plurality of ventilation openings 150 formed around a circumference of the brake rotor 126, a plurality of ventilation openings 152 formed around a circumference of the brake shoe 128 and brake pad 130, and the plurality of ventilation openings 148 formed in the ends of the housing 104 and configured to extend to a side of the housing 104. The plurality of openings 152 formed around the circumference of the brake shoe 128 and brake pad 130 are provided to align with the plurality of openings 148 formed in the ends of the housing 104. The brake pad 130 may also include air flow channels 154 formed therein to further aid in the movement of air through the braking system 120 and out of the housing 104.

The motor 100 may optionally include dividing plates 137 positioned between the motor body or bodies 112 and the brake actuators 132. As shown in FIGS. 4 and 5, the dividing plate 137 separates the pockets 140 from the biasing members 134 and the electromagnets 136 and the ventilation openings 148 from the motor body 112. The covering of the ventilation openings 148 protects the motor body 112 against dust contaminations, e.g. from the brake pads 130, but limits the cooling effect of the motor body 112. In another version, not shown, the dividing plate 137 has openings aligned with the ventilation openings 148 at the housing ends and the air can flow through the motor. In the shown version, the dividing plate supports one end of the biasing members 134 and keeps the electromagnets 136 in the vertical position.

In operation, the brake rotor 126 ventilates the braking system 120. As the brake rotor 126 rotates with the motor shaft 106, air is drawn through the ventilation openings 150 of the brake rotor 126 due to the angular shape of these openings 150. The air flow direction depends on the direction of rotation of the brake rotor 126. The air then flows through the air flow channels 154 of the brake pad 130 and the openings 152 of the brake shoe 128. The air then flows through the ventilation openings 148 of the housing 104 and out the side of the housing 104 to the atmosphere. The direction of air flow is shown by arrow A in FIG. 7. As discussed herein, since one side of the brake rotor 126 is not covered, thermal energy can leave the brake as convection and radiant heat. In addition, the air flow channels 154 in the brake pads 130, along with the openings 152 provided through the brake shoes 128 provided on the other side of the brake rotor 126, support a fast heat dissipation and prevent peak temperatures, which reduce the lifetime of conventional enclosed disk brakes. The ventilation system described above allows for brake temperatures in the range of about 300° C. without damaging the brake.

As shown in FIG. 4, the motor 100 includes two identical part sets provided at each end of the motor shaft 106. More specifically, each end of the motor shaft 106 may include a housing 104, a bearing 138, a braking system 120, a motor body 112, and traction sheaves 102. However, this is not to be construed as limiting the present invention as the braking system 120 and traction sheaves may only be provided at one end of the motor shaft 106. In addition, both one piece housings and motor bodies (see FIGS. 2 and 3) as well as two-piece housings and motor bodies (see FIG. 4) have been envisioned.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements. For example, it is to be understood that the present disclosure contemplates that, to the extent possible, one or more features of any embodiment can be combined with one or more features of any other embodiment.

The invention claimed is:

1. A motor comprising:
   a housing;
   a motor shaft surrounded by the housing and having at least a first end extending outward from the housing;
   a motor body arranged around a central portion of the motor shaft and positioned within the housing;
   at least one sheave positioned at the first end of the motor shaft and rotatable with the motor shaft;
   a braking system positioned at a first end of the housing; and
   a ventilation system configured to allow heat to dissipate from the housing,
   wherein the braking system comprises:

a brake rotor connected to and rotatable with the motor shaft, the brake rotor positioned outside of the housing and configured to close an axial opening at the first end of the housing;
a brake shoe positioned within the housing at the first end of the housing; and
a brake actuator configured to selectively move the brake shoe between a brake position in which the brake shoe is in contact with the brake rotor to resist rotation of the motor shaft and a rotation position in which the brake shoe is free from contact with the brake rotor, and
wherein the ventilation system comprises:
a plurality of openings formed around a circumference of the brake rotor;
a plurality of openings formed around a circumference of the brake shoe; and
a plurality of openings formed in the first end of the housing and extending outwardly through the housing.

2. The motor of claim 1, further comprising a bearing positioned at the first end of the housing in contact with the motor shaft and parallel to the brake actuator in a longitudinal direction of the motor shaft, and wherein the bearing and the brake actuator are at least partially aligned in a radial direction of the motor shaft.

3. The motor of claim 2, wherein a length of the brake actuator in the longitudinal direction of the motor shaft is less than or equal to a length of the bearing in the longitudinal direction of the motor shaft.

4. The motor of claim 1, wherein the plurality of openings formed around the circumference of the brake shoe is arranged to align with the plurality of openings formed in the first end of the housing.

5. The motor of claim 1, wherein the motor shaft further comprises a second end extending outside of the housing opposite to the first end of the motor shaft.

6. The motor of claim 5, wherein at least one sheave is positioned at the second end of the motor shaft and is rotatable with the motor shaft.

7. The motor of claim 5, wherein a second braking system is positioned at a second end of the housing.

8. The motor of claim 7, wherein the second braking system comprises:
a second brake rotor connected to and rotatable with the motor shaft and closing an axial opening at the second end of the housing;
a second brake shoe positioned at the second end of the housing; and
a second brake actuator configured to selectively move the second brake shoe between a brake position in which the second brake shoe is in contact with the second brake rotor to resist rotation of the motor shaft and a rotation position in which the second brake shoe is free from contact with the second brake rotor.

9. An elevator system comprising:
a car configured to move up and down within an elevator shaft; and
a motor disposed in the elevator shaft to move the car up and down within the elevator shaft, the motor comprising:
a housing;
a motor shaft surrounded by the housing and having at least a first end extending outward from the housing;
a motor body arranged around a central portion of the motor shaft and positioned within the housing;
at least one sheave positioned at the first end of the motor shaft and rotatable with the motor shaft;
a braking system positioned at a first end of the housing, the braking system comprising: a brake rotor connected to and rotatable with the motor shaft, the brake rotor positioned outside of the housing and configured to close an axial opening at the first end of the housing; a brake shoe positioned within the housing at the first end of the housing; and a brake actuator configured to selectively move the brake shoe between a brake position in which the brake shoe is in contact with the brake rotor to resist rotation of the motor shaft and a rotation position in which the brake shoe is free from contact with the brake rotor; and
a ventilation system configured to allow heat to dissipate from the housing, the ventilation system comprising: a plurality of openings formed around a circumference of the brake rotor; a plurality of openings formed around a circumference of the brake shoe; and a plurality of openings formed in the first end of the housing and extending outwardly through the housing.

10. The elevator system of claim 9, wherein the motor further comprises a bearing positioned at the first end of the housing in contact with the motor shaft and parallel to the brake actuator in a longitudinal direction of the motor shaft, and wherein the bearing and the brake actuator are at least partially aligned in a radial direction of the motor shaft.

11. The elevator system of claim 10, wherein a length of the brake actuator in the longitudinal direction of the motor shaft is less than or equal to a length of the bearing in the longitudinal direction of the motor shaft.

12. The elevator system of claim 9, wherein the plurality of openings formed around the circumference of the brake shoe is arranged to align with the plurality of openings formed in the first end of the housing.

13. The elevator system of claim 9, wherein the motor shaft further comprises a second end extending outside of the housing opposite to the first end of the motor shaft.

14. The elevator system of claim 13, wherein at least one sheave is positioned at the second end of the motor shaft and is rotatable with the motor shaft.

15. The elevator system of claim 13, wherein a second braking system is positioned at a second end of the housing.

16. The elevator system of claim 15, wherein the second braking system comprises:
a second brake rotor connected to and rotatable with the motor shaft and closing an axial opening at the second end of the housing;
a second brake shoe positioned at the second end of the housing; and
a second brake actuator configured to selectively move the second brake shoe between a brake position in which the second brake shoe is in contact with the second brake rotor to resist rotation of the motor shaft and a rotation position in which the second brake shoe is free from contact with the second brake rotor.

* * * * *